US006272413B1

(12) United States Patent
Takahashi et al.

(10) Patent No.: US 6,272,413 B1

(45) Date of Patent: Aug. 7, 2001

(54) SAFETY SYSTEM FOR BOOM-EQUIPPED VEHICLE

(75) Inventors: Norihisa Takahashi; Nobuyuki Yamaguchi, both of Ageo; Akihiko Ohira, Niiharu-mura, all of (JP)

(73) Assignee: Kabushiki Kaisha Aichi Corporation, Aichi (JP)

( * ) Notice: Subject to any disclaimer, the term of this patent is extended or adjusted under 35 U.S.C. 154(b) by 0 days.

(21) Appl. No.: 09/521,798

(22) Filed: Mar. 9, 2000

(30) Foreign Application Priority Data

Mar. 19, 1999 (JP) .................................... 11-074906
Nov. 30, 1999 (JP) .................................... 11-338962

(51) Int. Cl.[7] .......................... G06F 7/00; G06F 17/00; G06F 19/00

(52) U.S. Cl. .......................... 701/50; 52/111; 52/116; 52/238; 52/365; 212/111; 212/118; 212/240; 212/255; 212/271; 212/294; 212/295; 212/210; 182/115; 182/116; 182/120; 182/18; 182/19

(58) Field of Search .......................... 701/50, 1; 52/111, 52/116, 238, 29, 365; 182/115, 18, 116, 19, 120, 2, 541, 13; 212/111, 118, 240, 255, 271, 294, 295, 301; 180/9.5, 9.1; 37/348, 347

(56) References Cited

U.S. PATENT DOCUMENTS 3,774,217 * 11/1973 Bonner et al. .................. 343/225
4,039,094 * 8/1977 Grove .................. 214/132
4,273,214 * 6/1981 Grove .................. 182/2
4,456,093 * 6/1984 Finley et al. .................. 182/2
4,763,742 * 8/1988 Langford .................. 180/9.1
4,833,615 * 5/1989 Bitner et al. .................. 364/463
4,979,588 * 12/1990 Pike et al. .................. 182/18
5,244,168 * 9/1993 Williams .................. 244/134 R
5,404,661 * 4/1995 Sahm et al. .................. 37/348

FOREIGN PATENT DOCUMENTS 10-297899 * 9/1997 (JP) .
11-199196 * 10/1998 (JP) .

* cited by examiner

*Primary Examiner*—William A. Cuchlinski, Jr.
*Assistant Examiner*—Ronnie Mancho
(74) *Attorney, Agent, or Firm*—Klauber & Jackson; Stefan J. Klauber

(57) ABSTRACT

While a crawler body 110 is traveling, infrared sensors 144 and an elevational difference calculator 132 incorporated in a controller 130 detects the magnitude of a step present ahead of the crawler body 110. A safety speed calculator 134 calculates a safety speed based on the magnitude of the step detected and on the position of the platform 116 relative to the crawler body 110, which position is detected by various detectors 141~143 and by a position calculator 133. A comparator 135 compares this safety speed with the traveling speed of the crawler body 110, and if the current speed of the crawler body 110 is greater than the safety speed, then the comparator 135 outputs a warning signal. Upon receiving this signal, a restrictor 136 controls a valve controller 131 to reduce the speed of the crawler body 110 such that the crawler body 110 can travel over the step safely.

12 Claims, 9 Drawing Sheets

SAFETY SYSTEM FOR BOOM-EQUIPPED VEHICLE

FIELD OF THE INVENTION

The present invention relates to a boom-equipped vehicle which comprises an automotive vehicle body, a movable boom which is mounted on the vehicle body and at least being raised and lowered and extended and contracted, and a work station such as a work platform and a crane mounted on the tip of the boom. More particularly, the invention relates to a safety system which prevents the vehicle body from tipping.

The present invention furthermore relates to a safety system which enables such a boom-equipped vehicle to face and climb safely an elevational difference.

BACKGROUND OF THE INVENTION

A boom-equipped vehicle generally comprises an automotive vehicle body, a movable boom which is mounted on the vehicle body, and a work station which is mounted on the tip of the boom. The boom can be raised and lowered and extended and contracted and turned horizontally clockwise and counterclockwise on the vehicle body, and the work station can be a crane or a work platform for workmen to board. Such boom-equipped vehicles include, for example, crane trucks and aerial work platform machines. For such a boom-equipped vehicle to be used for performing a task, at first, the movable boom must be raised or lowered,extended or contracted and turned horizontally clockwise or counterclockwise to bring the work station to a desired aerial position.

While the boom is being moved, for example, being extended,the center of mass of the vehicle body shifts toward the tip of the boom, and, as a result, the moment that tends to act to tip or overturn the vehicle increases (this moment is hereinafter referred to as "tipping moment"). As the tipping moment increases, the vehicle becomes increasingly unstable and vulnerable for tipping. This is a particular problem which occurs with a boom-equipped vehicle. Therefore, a boom-equipped vehicle is generally equipped with a safety system which restricts the movement of the boom so that the tipping moment will not grow to a magnitude which actually tips the vehicle body.

Even while a boom-equipped vehicle incorporating such a safety system operates with the boom being raised and extended within a range of tolerance, there is still a danger of tipping. For example, when the boom is extended by a great amount, or when the boom is raised greatly upward though it is not extended by a large amount, the stability of the vehicle body is decreased substantially. If the vehicle in such a condition moves and encounters an upslope or a sudden difference in elevation (hereinafter referred to as "step"), then the tipping moment increases rapidly and the vehicle may overturn.

There is little problem of this kind as long as a boom-equipped vehicle travels over a flat ground. However, when the center of mass of the vehicle changes by a large amount as it encounters and moves over a step with the vehicle body being inclined, there is a danger that the vehicle may be overturned. To prevent such an accident, conventionally, there are rules. For example, a boom-equipped vehicle should not be driven over a dangerously large step (for example, a difference in elevation of 100 mm), which threatens to overturn the vehicle, or it should be driven very slowly in such a situation, notwithstanding whether the vehicle may overturn or not.

In such methods, the decision to drive the vehicle over the step or not is made by the driver with an intuition. Therefore, the driver in fear of the vehicle's overturning tends not to drive the vehicle over steps that can be safely climbed over if it is really tried. Thus, the prior-art safety system has been accompanied with this disadvantage which unnecessarily limits the utility and the workability of a boom-equipped vehicle.

SUMMARY OF THE INVENTION

It is an object of the present invention to provide a safety system which enables a boom-equipped vehicle with the boom being raised or extended to move over an upslope or a step at a high level of safety without any risk of the vehicle being turned over.

Another object of the present invention is to provide a safety system for a boom-equipped vehicle, which system is capable of determining precisely whether the vehicle can move safely over a step appearing in front, or not.

Still another object of the present invention is to provide a safety system for a boom-equipped vehicle which system enables the vehicle to pass safely over a step that is determined to be climbed safely.

To achieve these objectives, the present invention provides a first embodiment of safety system for a boom-equipped vehicle which comprises an automotive vehicle body (for example, the crawler body 11 described in the following section), a boom provided at least extensible and liftable on the vehicle body, and a work station (for example, the aerial platform 15 described in the following section) mounted at a tip of the boom. This safety system comprises elevation angle detecting means which detects the elevation angle of the boom, length detecting means which detects the length of the boom, slope angle detecting means which detects the inclination or slope angle of the vehicle in the front and rear direction, and travel restricting means which forbids the vehicle to travel if the elevation angle of the boom detected by the elevation angle detecting means is greater than a predetermined reference elevation angle or if the length of the boom detected by the length detecting means is greater than a predetermined reference length and if the slope angle of the vehicle body detected by the slope angle detecting means is greater than a predetermined reference slope angle.

With this safety system, when the vehicle starts traveling with the boom of the vehicle set at an elevation angle greater than the reference elevation angle or at a length greater than the reference length and if the slope angle of the vehicle body becomes greater than the reference slope angle, the vehicle is stopped. Therefore, there is no possibility that the vehicle body would topple over even while the vehicle with the boom being lifted and extended substantially travels over an upslope or a step. As a result, the worker aboard the vehicle can carry out his work safely in an efficient manner.

A second embodiment of safety system according to the present invention is provided for a boom-equipped vehicle which comprises an automotive vehicle body, a boom provided at least extensible and liftable on the vehicle body, and a work station mounted at a tip of the boom. This safety system comprises elevation angle detecting means which detects the elevation angle of the boom, length detecting means which detects the length of the boom, slope angle detecting means which detects the inclination or slope angle of the vehicle in the front and rear direction, and travel restricting means which forbids the vehicle to travel if the slope angle of the vehicle body detected by the slope angle detecting means is greater than a reference slope angle which is determined in correspondence to the combination of the elevation angle of the boom detected by the elevation angle detecting means and the length of the boom detected by the length detecting means.

With this safety system, if the slope angle of the vehicle body becomes greater than the reference slope angle which is determined in correspondence to the combination of the elevation angle and the length of the boom at the moment, then the vehicle is stopped. Therefore, as in the case of the above mentioned first invention, there is no possibility that the vehicle body would topple over even while the vehicle with the boom being lifted and extended substantially travels over an upslope or a step.

It is preferable that each of the two safety systems described above include boom actuation restricting means which forbids the lifting and extending of the boom while the vehicle is stopped by the travel restricting means. In this way, while the vehicle body is restrained from moving, the lifting and extending of the boom is also restrained to prevent the vehicle from being brought into a further unstable condition, which may be otherwise the case if the boom is moved in a wrong manner after the traveling of the vehicle has been restrained. With the first safety system, this restrained condition is releasable by lowering and contracting the boom,i.e., by making the elevation angle smaller than the reference elevation angle and the length of the boom shorter than the reference length. With the second safety system, this restrained condition is releasable by lowering or contracting the boom, i.e., by making the reference slope angle, which is determined for the renewed condition of the boom, larger than the actual slope angle of the vehicle body. Thus, no special procedure is required to clear the restriction. Also, there is no possibility that the travel restraint and the boom restriction would be released while the vehicle is still in an unstable condition. Therefore, the safety system of the present invention offers a high degree of safety.

When the above restriction is imposed, preferably, the safety system of the first invention forbids the boom to be contracted if the elevation angle of the boom is greater than the reference elevation angle, so the system allows only the boom to be lowered. This is to avoid a danger of the vehicle being tipped over backward, which may otherwise occur if the boom is contracted, and, as a result, the center of mass of the vehicle shifts backward. Therefore, if the length of the boom is less than or equal to the reference length when the restraint is imposed, to release the vehicle from the restraint, the boom is lowered until the elevation angle becomes smaller or equal to the reference elevation angle. On the other hand, if the length of the boom is greater than the reference length when the restraint is imposed, also, the boom is lowered until the elevation angle becomes smaller or equal to the reference elevation angle to increase the stability of the vehicle so as to avoid the vehicle being tipped over backward. Then, the boom is contracted to clear the restraint. In this way, the safety against tipping over of the vehicle body is improved further.

A third embodiment of safety system according to the present invention comprises step detecting means (for example, the infrared sensors 144 and the elevational difference calculator 132 of the controller 130 described in the following section) which detects the magnitude of a step present ahead of the vehicle body, speed detecting means which detects the traveling speed of the vehicle body, safety speed calculating means which calculates a safety speed for the vehicle to travel safely over the step, based on the magnitude of the step detected by the step detecting means, comparing means which compares the traveling speed of the vehicle body detected by the speed detecting means with the safety speed calculated by the safety speed calculating means and outputs a warning signal if the traveling speed is greater than the safety speed, and warning means which takes a warning action when it receives the warning signal. This warning action includes a visual warning by an alarm lamp, an audio warning by an alarm buzzer and a restrictive action which restricts the traveling of the vehicle.

With this safety system, while the boom-equipped vehicle is traveling, if there is a step ahead of the vehicle body, the safety speed calculating means calculates a safety speed based on the magnitude of the step detected by the step detecting means (for example, a device which utilizes ultrasonic waves or infrared rays). This safety speed is compared with the actual speed of the vehicle detected by the speed detecting means, and if the actual speed is greater than the safety speed, then a warning action is taken. In this way, if there is a step ahead of the vehicle, the safety system judges, based on the magnitude of the step and the current speed of the vehicle body, whether the vehicle can travel over the step at the current speed or not. Only if the vehicle cannot pass at the current speed, then a warning is issued. Thus, the judgment of whether the vehicle can travel over the step ahead safely or not is carried out systematically and securely, so there is no possibility of the vehicle being tipped over while it is traveling.

In a case where the boom-equipped vehicle is an aerial work platform machine, it is preferable that the safety system further comprise position detecting means which detects the position of the aerial work platform relative to the vehicle body. In this case, the safety speed calculating means calculates a safety speed also based on the position of the platform relative to the vehicle body, which position is detected by the position detecting means. Furthermore, the warning action taken by the warning means preferably reduces the speed of the vehicle body to a speed which is less than the safety speed calculated by the safety speed calculating means before the vehicle travels over the step.

A fourth embodiment of safety system according to the present invention is a safety system for a boom-equipped vehicle which comprises an automotive vehicle body, a lifting device mounted on the vehicle body, and a work platform supported by the lifting device. This safety system comprises step detecting means which detects the magnitude of a step present ahead of the vehicle body and travel restricting means which restricts the traveling of the vehicle if the magnitude of the step detected by the step detecting means is greater than a predetermined value. With this safety system, also, the vehicle can travel safely over a step because the travel of the vehicle is restricted if the magnitude of the step ahead of the vehicle detected by the step detecting means is greater than the predetermined value.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 2:
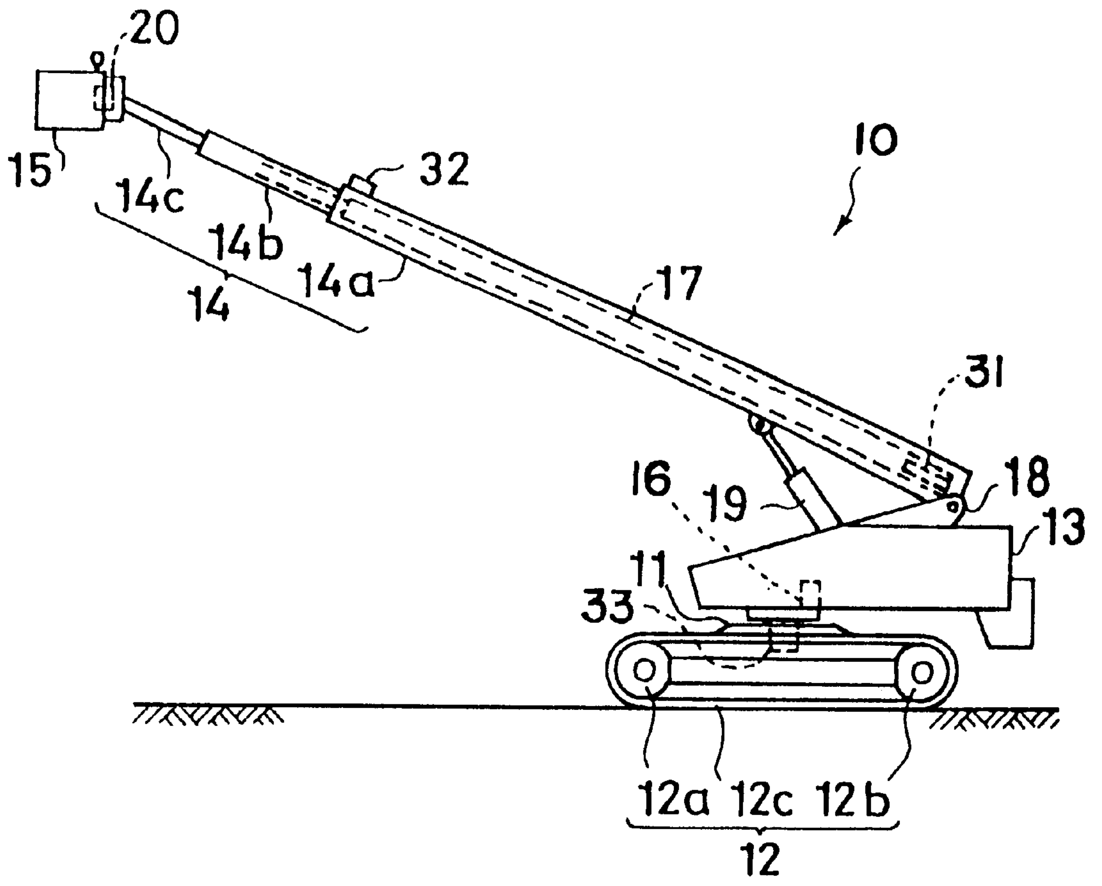
FIG. 2 is a side view of an automotive aerial work platform machine which incorporates the first or second embodiment of safety system.

FIG. 2 shows an automotive aerial work platform machine (hereinafter referred to as "platform machine") 10, which incorporates a first embodiment of safety system according to the present invention. This platform machine 10 comprises a crawler body 11, which includes a pair of crawlers 12 and 12, a swivel body 13, which is supported horizontally rotatable on the top of the crawler body 11, an extensible boom 14, which is mounted vertically pivotable on the top of the swivel body 13, and a work platform 15, which is supported horizontally pivotable on the tip of the boom 14, for a workman to stand on.

Each crawler 12 comprises a drive wheel 12*a*, an idler wheel 12*b* and a continuous belt 12*c*, which is disposed around the drive wheel 12*a* and idler wheel 12*b*, and the drive wheel 12*a* is rotated by the hydraulic pressure supplied from a hydraulic pump (not shown) which is incorporated in the swivel body 13.

The swivel body 13 is horizontally rotatable against the crawler body 11 by a rotary motor 16, which is incorporated in the swivel body 13 itself and is actuated hydraulically. The boom 14 comprises base, middle and tip sections 14*a*, 14*b*, and 14*c*, which telescope to extend and contract the length of the boom 14 by the hydraulic actuation of an extension cylinder 17 mounted inside the boom 14. The base section 14*a* of the boom 14 is connected pivotally on a boom bearing member 18 which is provided at the upper part of the swivel body 13, and a lifting cylinder 19 is provided between the swivel body 13 and the base section 14*a* such that the boom 14 is raised and lowered pivotally against the crawler body 11 by the hydraulic actuation of the lifting cylinder 19. The lifting cylinder 19, the extension cylinder 17 and the rotary motor 16 are all actuated by the hydraulic pressure supplied from the hydraulic pump as the drive wheels 12*a* of the crawlers 12 as described previously.

At the tip of the boom 14, provided is a vertical post (not shown), which is constructed to be maintained always vertical. The platform 15 is mounted on this vertical post so that the platform 15 is always maintained horizontally notwithstanding the condition of the boom 14. In addition, the platform 15 includes an electrical swing motor 20, which swings the platform horizontally around the vertical post when the motor is energized.

Figure 3:
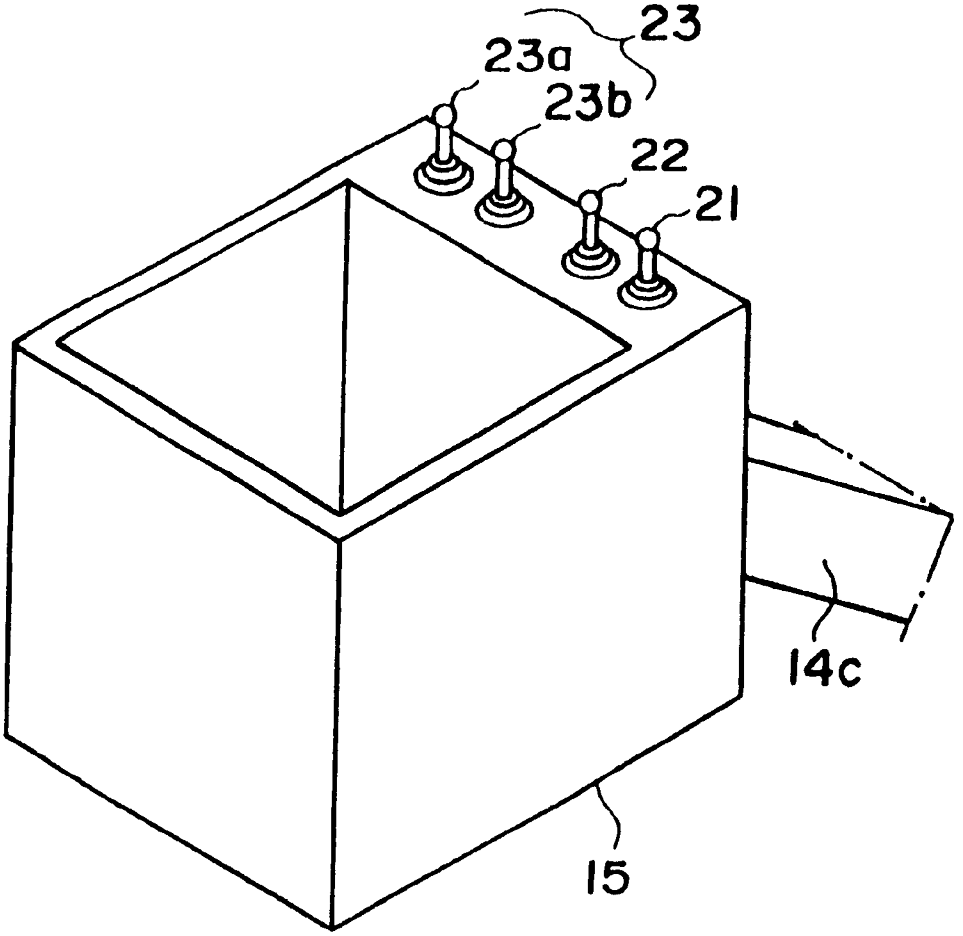
FIG. 3 is a perspective view of the work platform of the aerial work platform machine.

As shown in FIG. 3, the platform 15 is provided with a boom actuation lever 21, a swing actuation lever 22 and a pair of crawler actuation levers 23*b* and 23*a*, which are used to control the actuation of the right and left crawlers 12 and 12, respectively. The boom actuation lever 21 can be tilted from a neutral position to any direction including front and rear and right and left and covering all around 360 degrees, and it can be also twisted around the axis thereof. The swing actuation lever 22 and the crawler actuation levers 23*a* and 23*b* can be each tilted from a neutral position to front and rear directions. All these levers are manipulated by the workman, and each lever returns automatically to its neutral position upon being released from a tilted position or a twisted position.

At the bottom of the boom actuation lever 21, provided are a set of potentiometers to determine the condition of the lever 21 quantitatively. The potentiometers are arranged to detect the amounts or degrees of the tilt of the lever in the front and rear direction and in the right and left direction and of the twist of the lever. The signals output from the potentiometers are used as command signals to actuate the lifting cylinder 19, the extension cylinder 17 and the rotary motor 16, respectively.

The swing actuation lever 22 functions as a switch to turn on and off the swing motor 20. When the swing actuation lever 22 is at the neutral position, the motor is off. With the lever being tilted either forward or backward, the motor is turned on, and while the swing actuation lever 22 is tilted forward, the swing motor 20 rotates in a normal direction to swing the platform 15 counter-clockwise around the vertical post. On the other hand, while the swing actuation lever 22 is tilted backward, the swing motor 20 rotates in an opposite direction to swing the platform 15 clockwise around the vertical post.

At the bottoms of the right and left crawler actuation levers 23*b* and 23*a*, provided are sets of potentiometers to detect the amounts or degrees of the tilt of the levers in the front and rear direction. The signals output from the potentiometers are used as command signals to actuate the right and left crawlers 12 and 12, respectively.

An elevation angle detector 31 and a length detector 32 are provided at the base section and the tip section of the boom 14, respectively, to detect the elevation angle and the length of the boom 14. In addition, a turning angle detector 33, which detects the turning angle of the swivel body 13 and the boom 14, is provided near the rotary motor 16. Furthermore, the crawler body 11 includes a slope angle detector 34 (not shown in FIG. 2) to detect the slope angle in the front and rear direction of the crawler body 11.

Figure 1:
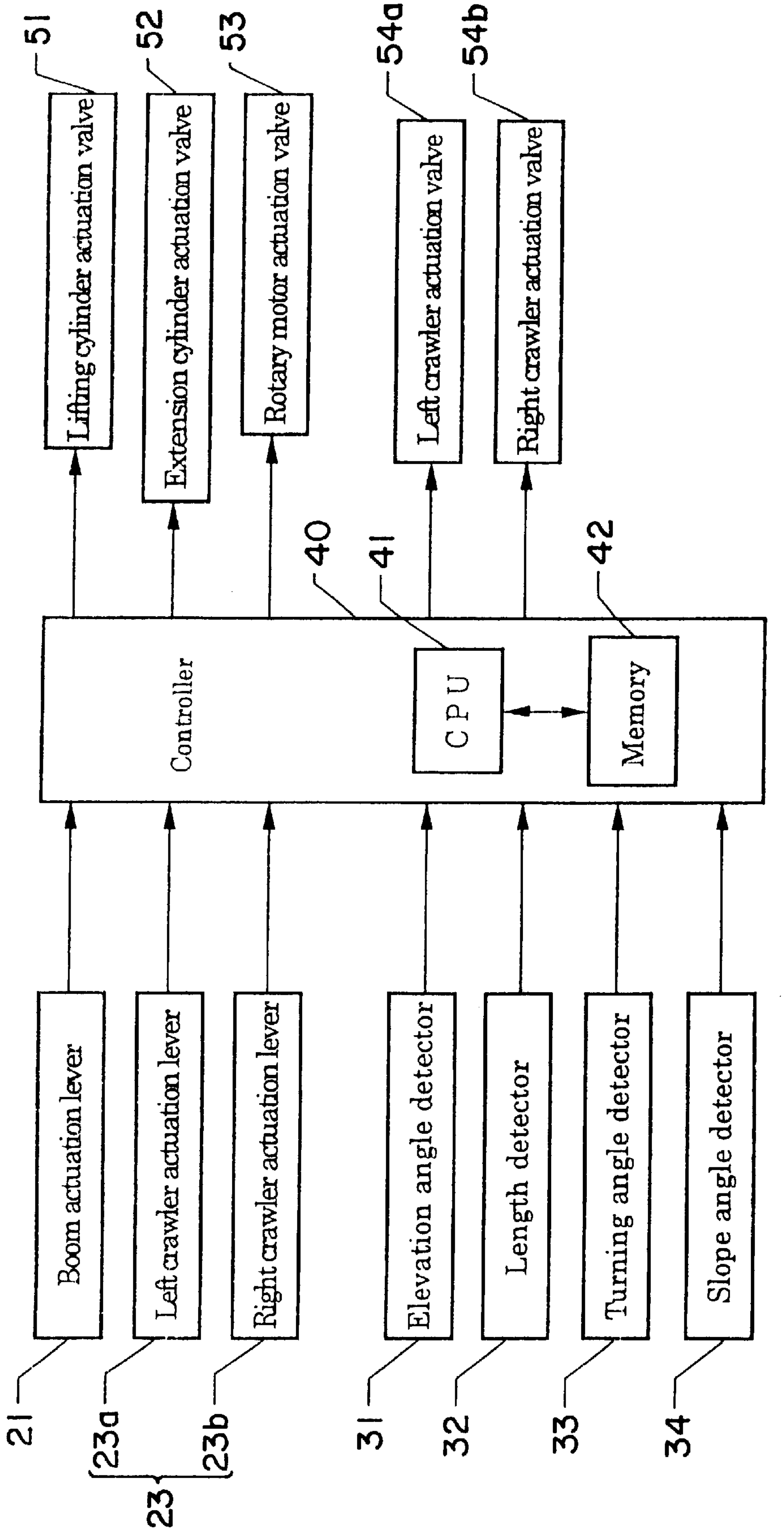
FIG. 1 is a block diagram of a control system incorporated in a boom-equipped vehicle, which control system includes a first or second embodiment of safety system according to the present invention.

FIG. 1 is a block diagram of the control system which includes a safety system according to the present invention. As shown in this figure, command signals output in correspondence to the manipulation of the boom actuation lever 21 and command signals output in correspondence to the manipulation of the crawler actuation levers 23*a* and 23*b* are input into a controller 40. Also, the values detected by the elevation angle detector 31, the length detector 32, the turning angle detector 33 and the slope angle detector 34 are input into the controller 40.

The controller 40, in turn, outputs control signals to actuate electromagnetic valves, i.e., a lifting cylinder actuation valve 51, an extension cylinder actuation valve 52 and a rotary motor actuation valve 53 so as to actuate hydraulically the lifting cylinder 19, the extension cylinder 17 and the rotary motor 16, respectively. The controller 40 also outputs control signals to actuate electromagnetically right and left crawler actuation valves 54*b* and 54*a* so as to actuate hydraulically the right and left crawlers 12 and 12, respectively.

When the workman aboard the platform 15 of this platform machine 10 manipulates, i.e., tilts or twists, the boom actuation lever 21, command signals which correspond to the manipulation are input into the controller 40. A CPU 41 incorporated in the controller 40 performs calculations on the information of the manipulation, i.e., the direction and amount of the tilt or the twist, of the boom actuation lever 21 transmitted by the command signals and on the information detected by the elevation angle detector 31, the length detector 32 and the turning angle detector 33 and outputs control signals to actuate the actuation valves 51~53 in correspondence. As a result, the boom 14 is lifted or lowered, extended or contracted, or turned clockwise or counterclockwise in correspondence to the manipulation of the boom actuation lever 21.

As mentioned previously, the platform 15 is swingable around the vertical post by the manipulation of the swing actuation lever 22. Therefore, the workman on the platform 15 by manipulating the boom actuation lever 21 and the swing actuation lever 22 by himself can bring the platform 15 to a desired aerial position and into a desired direction, so that he can perform aerial work in an optimal condition.

When the workman aboard the platform 15 tilts the crawler actuation levers 23*a* and 23*b*, command signals which correspond to the manipulation are input into the controller 40. The CPU 41 in the controller 40 performs calculations on the information of the manipulation, i.e., the direction and amount of the tilt, of the crawler actuation levers 23*a* and 23*b* transmitted by the command signals, and the CPU 41 outputs control signals to actuate the crawler actuation valves 54*a* and 54*b* in correspondence. As a result, the crawlers 12 and 12 are driven forward or backward in correspondence to the manipulation of the crawler actuation levers 23*a* and 23*b*, respectively.

As the right and left crawlers 12 and 12 are operated clockwise and counterclockwise independently from each other, it is necessary for the right and left crawlers to be simultaneously operated in the same direction to bring the crawler body 11 forward or backward. To turn the crawler body 11 rightward or leftward, only one crawler is operated, or these two crawlers are simultaneously operated in the opposite directions. The former operation results in a pivoting in which the crawler body turns around the stationary crawler 12 as a revolving center while the latter results in a spinning at the same exact location without any component of linear movement.

Three reference values, i.e., reference elevation angle $\alpha 0$, reference length L0, and reference slope angle $\theta 0$, are stored in a memory 42 which is incorporated in the controller 40. Here, the reference elevation angle $\alpha 0$ is an arbitrary value selected for the elevation angle of the boom 14 while the reference length L0 is an arbitrary value selected for the length of the boom 14. However, the reference slope angle $\theta 0$ is not an arbitrary value but is decided by multiplying a predetermined coefficient (<1) to the critical slope angle, i.e., the inclination angle of the crawler body 11 which leads to a tipping of the machine under a condition that the elevation angle of the boom 14 equals the reference elevation angle $\alpha 0$, and the length of the boom 14 equals the reference length L0 while the load of the platform 15 is at the maximum allowable weight.

The CPU 41 of the controller 40 continuously reads in three values $\alpha$, L and $\theta$, i.e., the elevation angle and the length of the boom 14 detected by the elevation angle detector 31 and the length detector 32 and the slope angle of the crawler body 11 detected by the slope angle detector 34, and compares these values to the above mentioned three reference values $\alpha 0$, L0 and $\theta 0$ to calculate the relative sizes of the three values which are being input continuously. If the detected elevation angle $\alpha$ of the boom is greater than the reference elevation angle $\alpha 0$ or if the detected length L of the boom is greater than the reference length L0 and if the detected slope angle $\theta$ of the crawler body is greater than the reference slope angle $\theta 0$, then the CPU 41 outputs control signals to retain the crawler actuation valves 54*a* and 54*b* at neutral position so as to prevent the crawler body 11 from moving, notwithstanding the existence of command signals from the crawler actuation levers 23*a* and 23*b*. In addition, the CPU 41 outputs control signals to retain the lifting cylinder actuation valve 51 and the extension cylinder actuation valve 52 at neutral so as to prevent the boom 14 from being lifted and extended (such actions will make the platform machine 10 more unstable), except when a command signal to lower or contract the boom 14 is present.

In the first embodiment of safety system according to the present invention, while the crawler body 11 is being driven with the boom 14 being lifted to an elevation angle $\alpha$ above the reference elevation angle $\alpha 0$ or being extended to a length L beyond the reference length L0, and if the slope angle $\theta$ of the crawler body becomes greater than the reference slope angle $\theta 0$, then the crawler body 11 is restrained from moving. Therefore, there is no possibility that the platform machine 10 would topple over even while the crawler body 11 with the boom 14 being lifted and extended by a substantial amount travels over an upslope or a step. As a result, the worker can concentrate on his work safely without any bother. While the crawler body 11 is restrained from moving, the lifting and extending of the boom 14 is also restrained to prevent the platform machine 10 from being brought into a further unstable condition, which may be the case otherwise if the boom is moved in a wrong manner after the crawler body 11 has been restrained.

This restrained condition, where the crawler body 11 is restrained from moving and the boom 14 is restrained from rising and extending, is releasable by lowering and contracting the boom 14, i.e., by making the elevation angle $\alpha$ smaller than the reference elevation angle $\alpha 0$ and the length L of the boom shorter than the reference length L0. Thus, no special procedure is required for the release of the drive restraint of the crawler body and of the movement restriction of the boom. Also, there is no possibility that these restraint and restriction would be released while the platform machine is still in an unstable condition. Therefore, the safety system of the present invention offers a high degree of safety for such machines.

Figure 4:
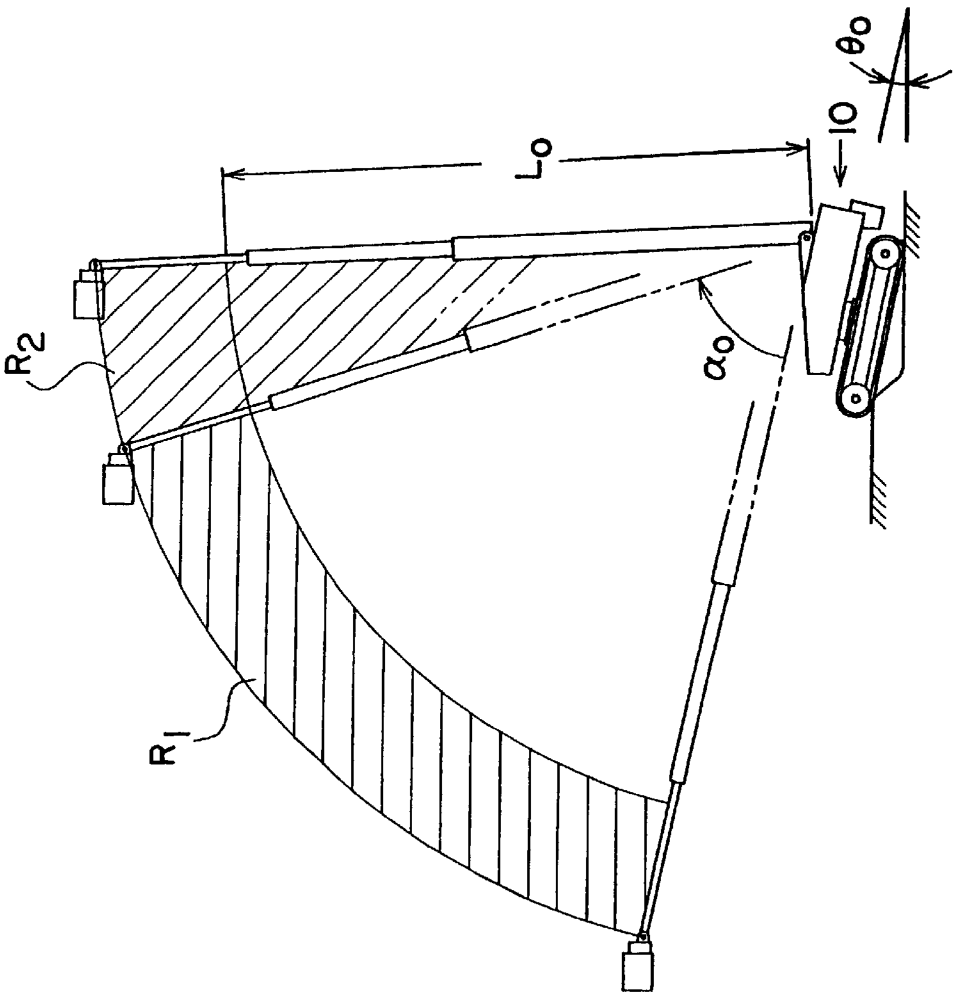
FIG. 4 is a diagram showing ranges of movement restrictions that are imposed on the boom of the aerial work platform machine while a drive restraint is in effect.

It is preferable that the safety system further restrict the boom 14 from contracting if the elevation angle $\alpha$ of the boom is greater than the reference elevation angle $\alpha 0$ while the crawler body is restrained from moving, so that only the lowering of the boom 14 will be allowed. This is to avoid a danger of the platform machine 10 being tipped over backward, which may otherwise occur if the boom 14 is contracted, and the center of mass of the machine shifts backward in correspondence. Therefore, if the length L of the boom 14 is less than or equal to the reference length L0 when the above described drive restraint is imposed on the platform machine 10 by the safety system, to release the machine from the restraint, the boom 14 is lowered until the elevation angle α becomes smaller or equal to the reference elevation angle α0. On the other hand, if the length L of the boom 14 is greater than the reference length L0 when the restraint is imposed, also, the boom 14 is lowered until the elevation angle α becomes smaller or equal to the reference elevation angle α0 to increase the stability of the machine so as to avoid the machine being tipped over backward. Then, the boom 14 is contracted to clear the restraint. In this way, the safety against the tipping over of the vehicle body is further improved. FIG. 4 is a diagram showing ranges of movement restrictions that are imposed on the boom 14 while a travel restraint is in effect. Area R1 (hatched with horizontal lines) represents a range where the boom 14 is restricted from rising and extending, and area R2 (hatched with oblique lines) represents a range where the boom 14 is restricted from rising, extending and contracting.

In the above embodiment, the reference slope angle θ0 is determined for the maximum allowable load of the platform 15. However, the safety system can be arranged in another way by providing a load cell to the platform 15. In this embodiment, the reference slope angle θ0 is determined optimally in correspondence to the load which is carried by the platform 15 and detected by the load cell. Therefore, in this case, data of reference slope angles θ0, each of which is determined for a consecutive load value W against the reference elevation angle α0 and the reference length L0, are stored in a table format in the memory 42 of the controller 40. In this way, while the reference elevation angle α0 and the reference length L0 are constant, the smaller the load value W, the larger the reference slope angle θ0 can be. This embodiment offers a wider range for the boom to move freely than the previous embodiment, in which the reference slope angle θ0 is determined solely for the maximum allowable load. In this embodiment, the reference slope angles θ0, which correspond to the consecutive load values W, are decided by multiplying a predetermined coefficient (<1) to the critical slope angles, i.e., the inclination angles of the crawler body 11 which result in a tipping of the machine under a condition that the elevation angle of the boom 14 equals the reference elevation angle α0, and the length of the boom 14 equals the reference length L0 while the loads of the platform 15 are at the consecutive load values W.

Now, a second embodiment of safety system according to the present invention is described. This safety system is identical with the first embodiment of safety system according to the present invention, except that the controller 40 performs differently. Therefore, the following description of the second embodiment of safety system according to the invention deals only with the controller 40, and no description of the other parts is given.

In the memory 42 of the controller 40 of the second embodiment according to the invention, a plurality of values which represent reference slope angles θ0 are determined for various combinations of elevation angles α1 and lengths L1 of the boom 14 and are stored in a table format. In this table, each reference slope angle θ0 is decided by multiplying a predetermined coefficient (<1) to the critical slope angle, i.e., the inclination angle of the crawler body 11 which results in a tipping of the machine under a condition that the elevation angle of the boom 14 equals an elevation angle α1, and the length L of the boom 14 equals a length L1 while the load of the platform 15 is at the maximum allowable weight.

The CPU 41 of the controller 40 continuously reads in two values α and L which represent the elevation angle and the length of the boom 14 detected by the elevation angle detector 31 and the length detector 32, and compares consecutively the combinations of these values α and L to the above mentioned table of elevation angles α1 and lengths L1 to find the reference slope angle θ0 at the moment. The CPU 41 simultaneously and continuously compares the slope angle of the crawler body 11 detected by the slope angle detector 34 to this reference slope angle θ0 to find out which is larger. In this processing, if the CPU 41 detects that the slope angle θ of the crawler body is greater than the reference slope angle θ0, then the CPU 41 outputs control signals to retain the crawler actuation valves **54*a* and 54*b* at neutral position so as to prevent the crawler body 11 from moving, notwithstanding the existence of command signals from the crawler actuation levers 23*a* and 23*b*. In addition, the CPU 41 outputs control signals to retain the lifting cylinder actuation valve 51 and the extension cylinder actuation valve 52 at neutral so as to prevent the boom 14 from being lifted and extended (such actions will make the platform machine 10 more unstable), except when a command signal to lower or contract the boom 14** is present.

In the second embodiment of safety system according to the invention, if the slope angle θ of the crawler body becomes greater than the reference slope angle θ0 which is determined in correspondence to the combination of the elevation angle α and the length L of the boom at the moment, then the crawler body 11 is restrained from moving. Therefore,as in the case with the first embodiment of safety system according to the invention, there is no possibility that the platform machine 10 would topple over even while the crawler body 11 with the boom 14 being lifted and extended by a substantial amount travels over an upslope or a step. While the crawler body 11 is restrained from moving, the lifting and extending of the boom 14 is also restrained to prevent the platform machine 10 from being brought into a further unstable condition, which may be the case if the boom is moved in a wrong manner after the crawler body 11 has been restrained.

This restrained condition, where the crawler body 11 is restrained from moving and the boom 14 is restrained from being lifted and extended, is releasable by lowering and contracting the boom 14 to make the reference slope angle θ0, which is renewed for this lowered and contracted condition of the boom, larger than the present slope angle θ of the crawler body. Thus, as in the first embodiment of safety system according to the invention, no special procedure is required for the release of the travel restraint of the crawler body and of the movement restriction of the boom. Also, there is no possibility that these restraint and restriction would be released while the platform machine is still in an unstable condition.

Also, in this embodiment, it is preferable that the safety system further comprise a load cell, which detects the load of the platform 15. In this case, the reference slope angle θ0 is determined optimally in correspondence to the value detected by the load cell. Specifically, the reference slope angle θ0 is determined in correspondence to the combination of the elevation angle α and the length L of the boom,which are detected by the respective detectors, and of the load value W detected by the load cell. This embodiment offers a wider range for the boom to move freely than the previous embodiment, in which the reference slope angle θ0 is determined solely for the maximum allowable load. In this embodiment, each reference slope angle θ0 is decided by multiplying a predetermined coefficient (<1) to the critical slope angle, i.e., the inclination angle of the crawler body 11 which results in a tipping of the machine under a condition that the boom 14 is at an elevation angle α and at a length L while the platform 15 is carrying a load W.

The present invention is not limited to the above described safety systems, which are embodied for aerial work platform machines, so various modifications are possible. For example, in the above described first and second embodiments, the turning angle of the boom 14, which is the angle of the horizontal rotation of the boom detected by the turning angle detector, is not considered. However, it is preferable that the reference slope angle θ0 be determined in consideration of the turning angle of the boom 14 as the optimal reference slope angle θ0 changes if the turning angle changes. In this case, the controller 40 carries out operations on data which include the information detected by the turning angle detector 33, and preferably, the controller stops the crawler body 11 and restricts the movement of the boom 14 if necessary. This embodiment offers an even wider range for the boom to move freely and safely.

In the above described embodiments, an automotive aerial work platform machine is used as an example. This platform machine may include a driver seat where a driver sits to drive the crawler body. Moreover, the work station which is provided at the tip of the boom 14 may be a crane (or a sheave), etc. instead of the platform 15. Furthermore,the platform machine may comprise as traveling means a plurality of tires instead of crawlers 12.

Figure 5:
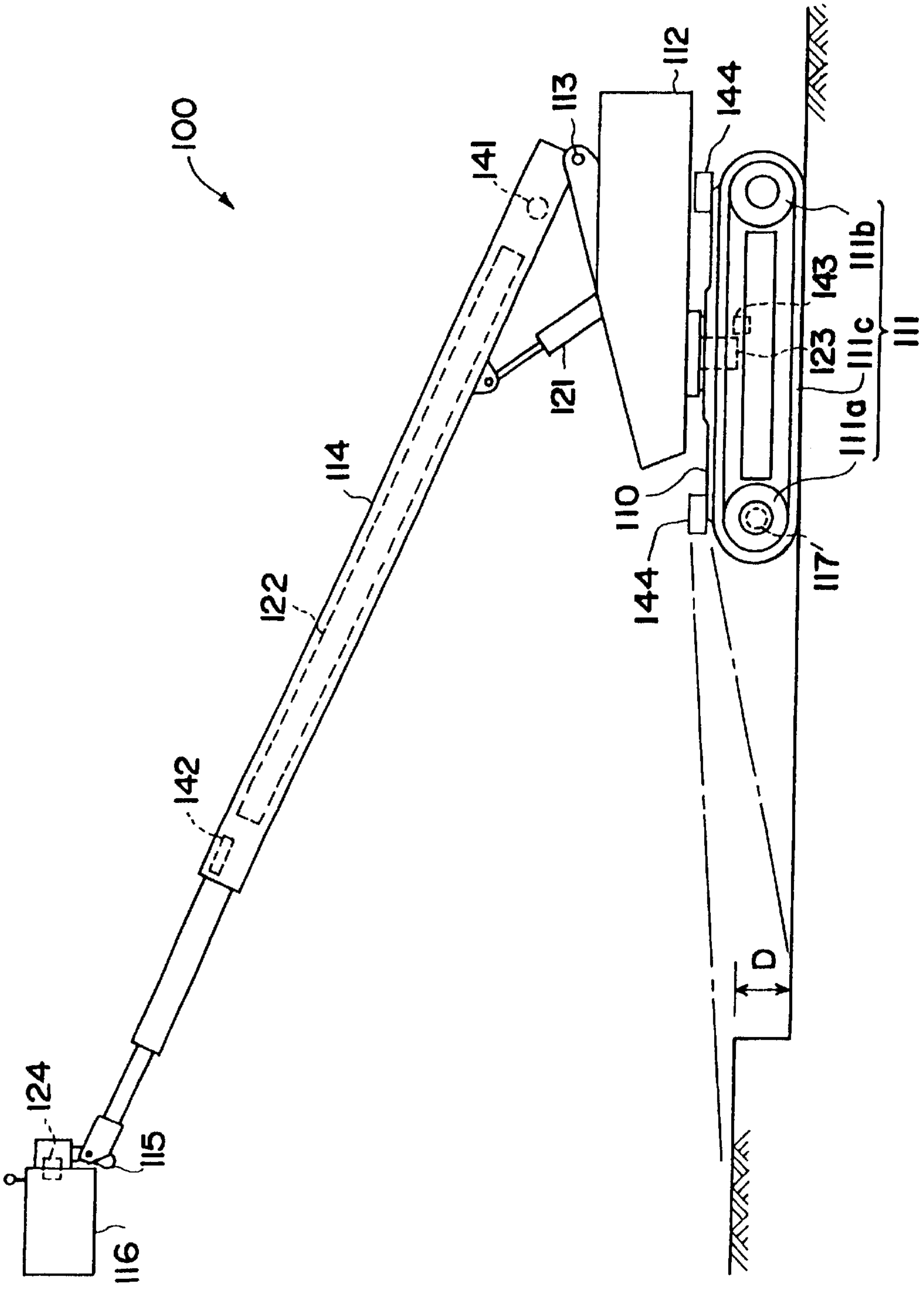
FIG. 5 is a side view of an aerial work platform machine which incorporates a third or fourth embodiment of safety system according to the present invention.

FIG. 5 is a side view of an aerial work platform machine 100 which incorporates a third embodiment of safety system according to the present invention. This platform machine 100 comprises a crawler body 110, which includes a pair of crawlers 111 and 111, a swivel body 112, which is supported on the top of the crawler body 110, an extensible boom 114, which is mounted vertically pivotable around a foot pin 113 on the top of the swivel body 112, a vertical post 115, which is supported and maintained always in a vertical orientation at the tip of the boom 114, and a work platform 116, which is supported on the vertical post 115 for a workman to stand on.

Each crawler 111 comprises a drive wheel 111*a*, an idler wheel 111*b* and a continuous belt 111*c*, which is disposed around the drive wheel 111*a* and idler wheel 111*b*, and each drive wheel 111*a* is rotated by a drive motor 117 which is provided laterally on either side in the crawler body 110.

The boom 114 comprises a plurality of boom sections, which are disposed in a telescopic construction. The boom 114 can be lifted by a lifting cylinder 121 which is provided between the swivel body 112 and the base section of the boom, and it can be extended and contracted by an extension cylinder 122 which is provided inside the boom. The swivel body 112 is horizontally rotatable against the crawler body 110 by a rotary motor 123, which is incorporated in the crawler body 110, such that the whole boom 114 is rotatable horizontally. In addition, the platform 116 includes a swing motor 124, which swings the platform 116 horizontally around the vertical post 115 when the motor is activated.

Figure 7:
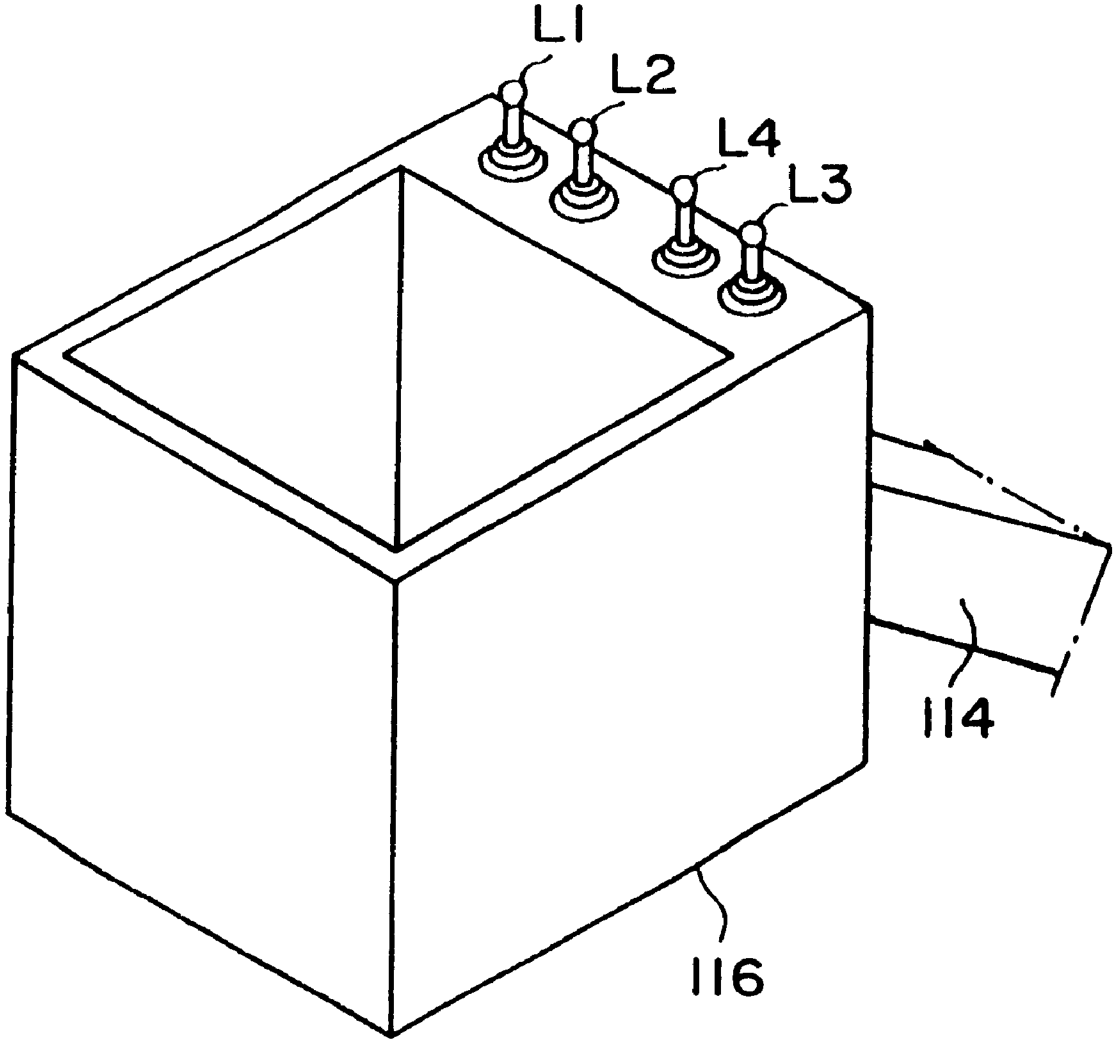
FIG. 7 is a perspective view of the platform of the latter aerial work platform machine.

As shown in FIG. 7, the platform 116 is provided with a pair of crawler actuation levers L1 and L2, a boom actuation lever L3, and a swing actuation lever L4. These levers can be tilted from a vertical position (at neutral) manually by the workman aboard the platform.

Figure 6:
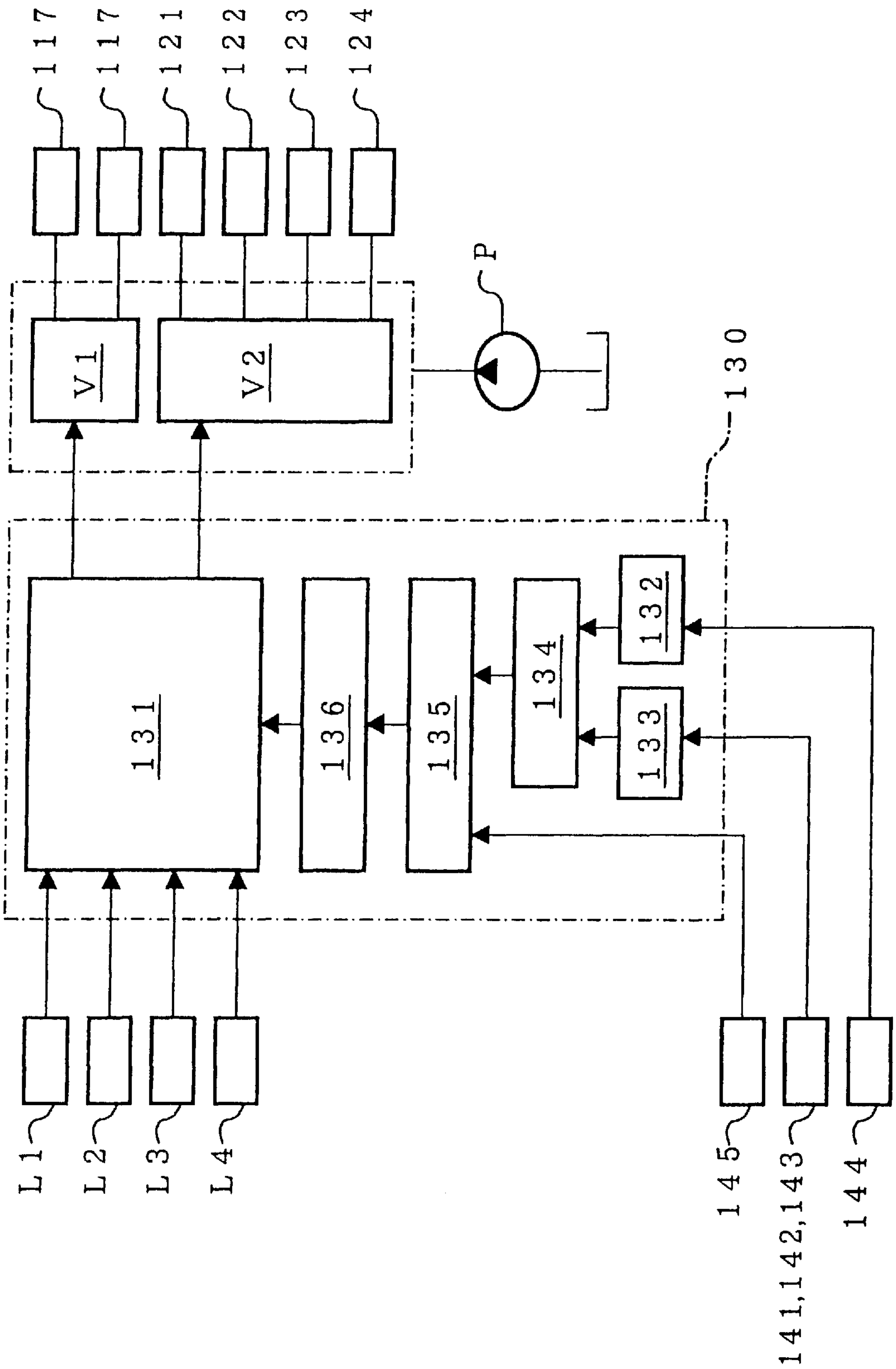
FIG. 6 is a block diagram showing the construction of the third embodiment of safety system according to the present invention.

FIG. 6 is a block diagram of the control system of the platform machine 100, and the control system includes a safety system according to the present invention. Here, the controller 130 of the system is described having separate functional parts, namely, a valve controller 131, an elevational difference calculator 132, a position calculator 133, a safety speed calculator 134, a comparator 135 and a restrictor 136, to make the description clear and easily understandable, so the real controller 130 may not be constructed to include these separate parts.

In this control system, when the workman aboard the platform manipulates the crawler actuation levers L1 and L2, signals to command the actuation of the crawlers are generated in correspondence to the manipulation and sent to the valve controller 131 of the controller 130. Upon receiving these command signals, the valve controller 131 actuates electromagnetically a control valve V1 which controls the supply of hydraulic oil from a hydraulic pump P to drive the right and left drive motors 117. As the right and left drive motors 117 are rotatable clockwise and counterclockwise independently from each other, the right and left drive motors must be simultaneously operated in the same direction to bring the crawler body forward or backward. To turn the crawler body rightward or leftward, only one crawler 111 can be operated to make the crawler body pivot around the stationary crawler, or the two crawlers are simultaneously operated in the opposite directions to make the crawler body spin on the site.

In the same way, the boom actuation lever L3 generates signals to command the lifting or lowering, the extending or contracting and the turning clockwise or counterclockwise of the boom 114 in correspondence to the manipulation, and the manipulation of the swing actuation lever L4 generates signals to command swing the platform clockwise or counterclockwise. These signals are also sent to the valve controller 131 of the controller 130. Upon receiving these command signals, the valve controller 131 actuates electromagnetically a control valve V2 which controls the supply of hydraulic oil from the hydraulic pump P to drive the lifting cylinder 121, the extension cylinder 122, the rotary motor 123 and the swing motor 124, respectively. With this construction, the workman aboard the platform can manipulate the boom actuation lever L3 and the swing actuation lever L4 to lift or lower, extend or contract, or turn horizontally clockwise or counterclockwise the boom 114 and to swing horizontally clockwise or counterclockwise the platform 116 so as to bring the platform 116 to a desired aerial position.

A pair of infrared sensors 144 and 144 are provided at the front and the rear of the crawler body 110 (or the swivel body 112). Either infrared sensor 144 radiates infrared rays toward the ground where the platform machine is proceeding (i.e., forward when the machine is traveling forward, or rearward when the machine is traveling backward), catches reflected waves and sends the information to the elevational difference calculator 132 of the controller 130. The elevational difference calculator 132 calculates elevational differences ahead based on the information received from the infrared sensor 144. Thus, if there is a sudden elevational difference or a step ahead of the crawler body 110, then the magnitude of the step is calculated by the elevational difference calculator 132. FIG. 5 shows that the crawler body 110 is traveling forward (toward the left side of the drawing), and the front infrared sensor 144 is detecting the height D of the step. Term "step" used here includes a step in which the elevation of the ground increases as well as a step where the elevation decreases.

An elevation angle detector 141 and a length detector 142 are provided at the base section and the tip section of the boom 114, respectively, to detect the elevation angle and the length of the boom 114. In addition, a turning angle detector

143, which detects the turning angle of the swivel body 112 and the boom 114, is provided near the rotary motor 123. The information detected by these detectors are sent to the controller 130, and, based on the information received, the position calculator 133 of the controller 130 calculates the present position of the platform 116 relative to the crawler body 110.

Figure 8:
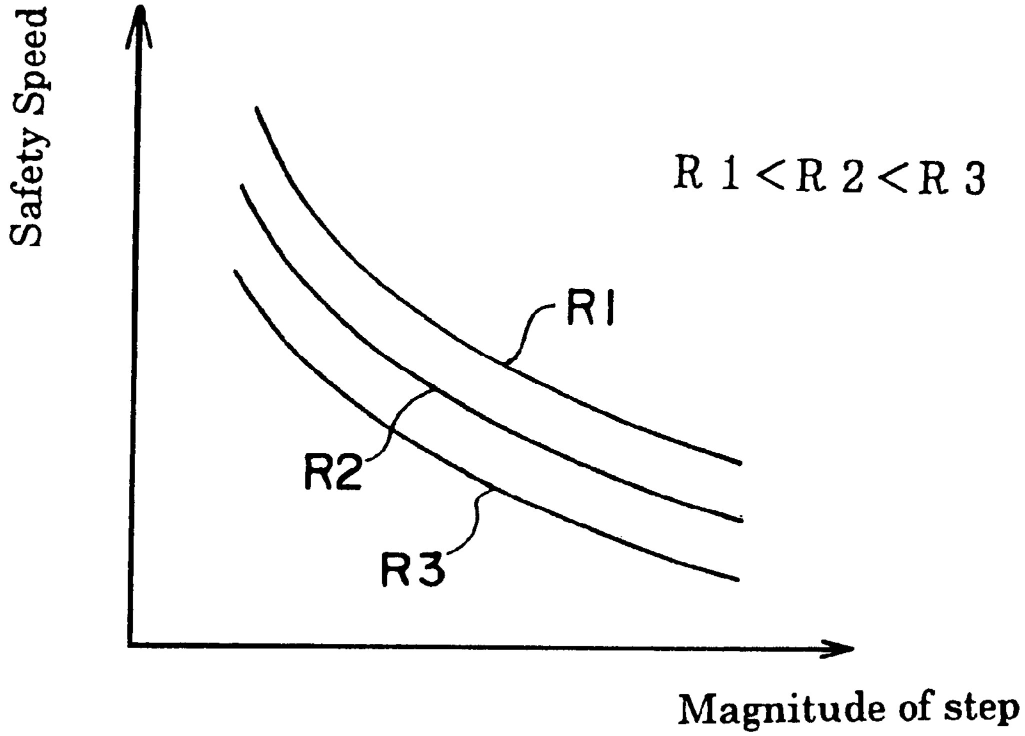
FIG. 8 is a graph showing, as an example, safety speed data that are calculated by a safety speed calculator of a controller.

The safety speed calculator 134 of the controller 130 calculates a safety speed based on the magnitude of the step calculated by the elevational difference calculator 132 and on the relative position (for example, the height) of the platform 116 calculated by the position calculator 133. Here, the safety speed is the maximum speed at which the crawler body 110 can travel over the step detected by the infrared sensors 144 and the elevational difference calculator 132. Such data of safety speeds are organized in a table format and stored in memory. FIG. 8 shows some examples. The graph of FIG. 8 shows the effect of the height of the platform 116 on the safety speed, with R1, R2, R3 and R4 (R1<R2<R3<R4) representing the platform at different heights. It is clear that the larger the height, the smaller the safety speed. In addition to the height of the platform 116, the elevation angle of the boom 114 and the distance between the platform 116 and the crawler body 110 (or the foot pin 113) may be included as information to describe the position of the platform 116 relative to the crawler body 110 in the calculation of the safety speed. Also in such case, the greater the values for the relative position of the platform, the smaller the safety speed.

The crawler body 110 includes a speed sensor 145, which detects the traveling speed of the crawler body 110 (not shown in FIG. 5). The information detected by the speed sensor 145 is sent continually to the comparator 135 of the controller 130. The comparator 135 compares the traveling speed detected by the speed sensor 145 with the safety speed calculated by the safety speed calculator 134. If the comparator 135 determines that the traveling speed of the crawler body 110 has become greater than the safety speed, then the comparator 135 outputs a warning signal.

While the restrictor 136 of the controller 130 is receiving the warning signal from the comparator 135, the restrictor 136 outputs a signal which effects the valve controller 131 to restrict the actuation of the control valve V1 such that the traveling speed of the crawler body 110 detected by the speed sensor 145 will decrease and become smaller than the safety speed calculated by the safety speed calculator 134.

With this construction, the safety system of the platform machine 100 works as follows. While the crawler body 110 is driven by the manipulation of the crawler actuation levers L1 and L2, the elevational difference ahead of the crawler body 110 is detected by the infrared sensors 144 and the elevational difference calculator 132 of the controller 130. Momentarily, the safety speed calculator 134 calculates the safety speed for the present condition, based on this elevational difference and the position of the platform 116 relative to the crawler body 110, which position is detected by the detectors 141~143 and the position calculator 133. Consecutively, the comparator 135 compares this safety speed with the actual speed of the crawler body 110. If the real speed is greater than the safety speed, then the comparator 135 outputs a warning signal. Upon receiving this signal, the restrictor 136 controls the valve controller 131 to reduce the speed of the crawler body 110 to a speed at which the crawler body 110 can travel safely. If there is a step, and the condition demands, then the crawler body 110 may be stopped completely.

According to this embodiment of the present invention, if there is a step ahead of the crawler body, the safety system judges, based on the magnitude of the step and the current speed of the crawler body, whether the platform machine can travel over the step at the current speed or not. Only if the machine cannot pass at the current speed, then a warning is issued (a forced speed reduction is made in this embodiment). In this way, the judgment of whether the machine can travel over the step ahead safely or not is carried out systematically and securely, so there is no possibility of the machine being tipped over while it is traveling. Moreover, in this judgment, different criteria may be applied for convex steps and for concave steps to improve the quality of the judgment.

Figure 9:
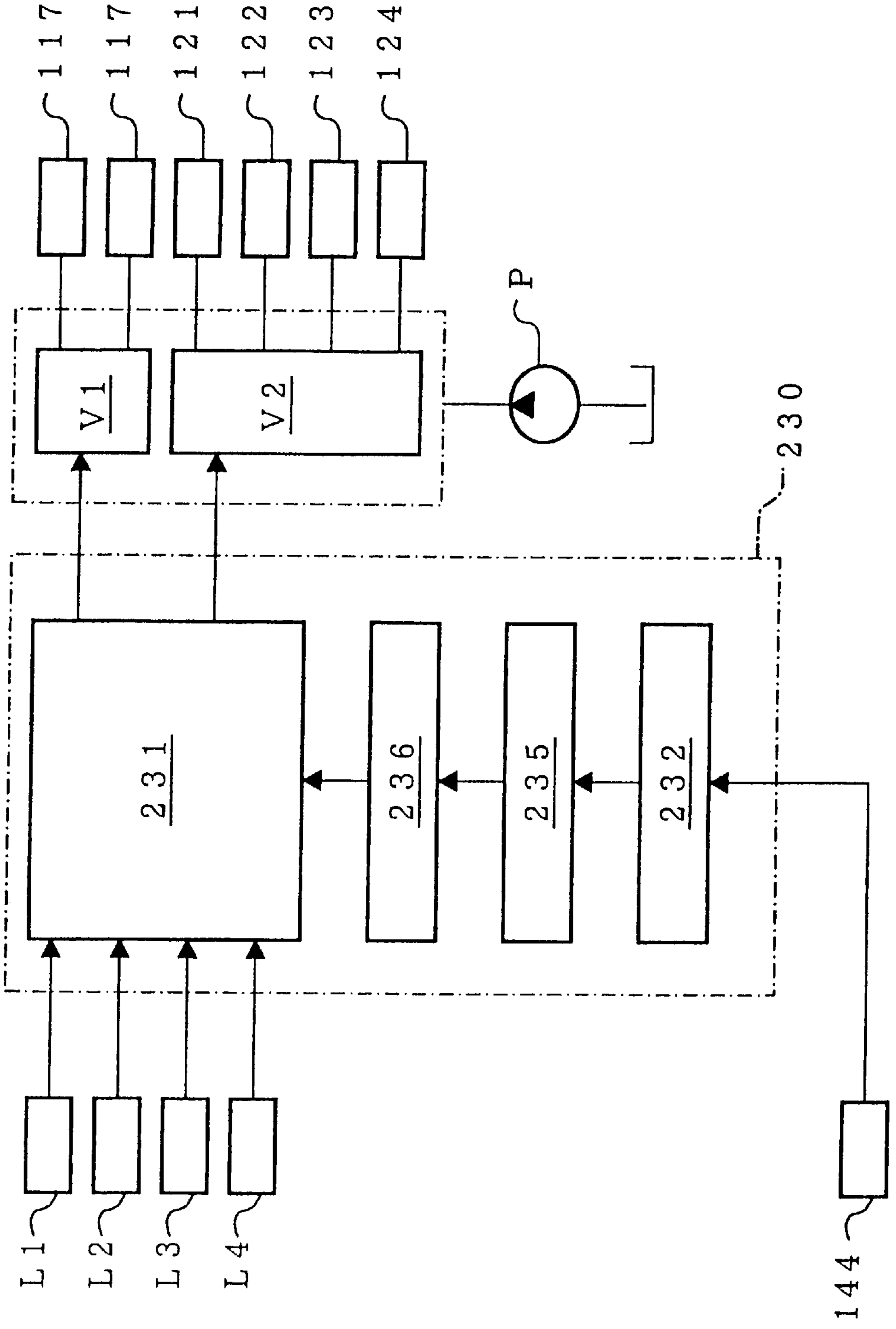
FIG. 9 is a block diagram showing the construction of the fourth embodiment of safety system according to the present invention.

Now, a fourth embodiment of safety system according to the present invention is described. This safety system can be incorporated also in the platform machine 100 instead of the above described safety system. This safety system differs from the previous safety system, only in the construction of the controller as shown in FIG. 9. This controller 230 comprises a valve controller 231, an elevational difference calculator 232, a comparator 235 and a restrictor 236. In the same way as the elevational difference calculator 132 of the controller 130, the elevational difference calculator 232 calculates the elevational difference and the magnitude of the step ahead, based on the information received from the infrared sensors 144. The comparator 235 compares this magnitude to a predetermined value (a fixed value). If the magnitude of the step is greater than the predetermined value, then the comparator 235 outputs a predetermined signal. While the restrictor 236 is receiving this signal, the restrictor 236 outputs a signal which effects the valve controller 231 to restrict the actuation of the control valve V1 so as to control the traveling speed of the crawler body 110. This speed control is to reduce the speed of the crawler body 110 to a speed at which the crawler body 110 can travel over the step ahead safely without the machine being tipped over, or to stop the crawler body 110 completely. With this safety system, the platform machine can travel over steps safely as in the case of the previously described safety system.

The present invention is not limited to the above described embodiments, and various modifications are possible within the scope of the present invention. For example, in the above described embodiments, the infrared sensors 144 are used as means to detect elevational differences or steps ahead of the crawler body 110. However, instead of these infrared sensors, the crawler body 110 can be provided with ultrasonic sensors. The ultrasonic sensors radiate ultrasonic waves toward the ground ahead of the crawler body 110 and catch reflected waves, so that the detected information is sent to the elevational difference calculator 132 or 232 of the controller 130 or 230. Upon receiving this information, the elevational difference calculator 132 or 232 calculates the elevational differences and, if there is a step ahead of the crawler body 110, it calculates the magnitude of the step. In this system, it is preferable that the ultrasonic sensors be adjusted to detect a step that exists further ahead in response to the increase of the traveling speed of the crawler body.

Also, in the above described embodiments, the safety speed calculator 134 requires the magnitude of the step and the position of the platform 116 relative to the crawler body 110 for the calculation of the safety speed. However, the calculation of the safety speed may be based only on the magnitude of the step. This way of calculation is identical with a calculation in which the position of the platform 116 relative to the crawler body 110 is held at a constant position. Therefore, in this case, the calculation should be executed including a condition that the height of the platform 116 is set at the maximum.

In the above former embodiment, when the comparator 135 outputs a warning signal, the speed of the crawler body 110 is forcibly reduced to the safety speed. However, this warning signal may be simply a light or a sound, which notifies the workman who manipulates the crawler actuation levers L1 and L2 and lets him reduce the speed of the crawler body 110. This light may be emitted by turning on (or flickering) a lamp, or this sound may be made by a warning buzzer.

Also, in the above latter embodiment, the comparator 235 compares the magnitude of the step detected to the predetermined value which is fixed or constant. However, this predetermined value may be a variable value which changes in correspondence to the speed of the crawler body 110 or to the position of the rotary motor 16 relative to the crawler body 110 or in correspondence to both these values.

Furthermore, the crawler body 110 of the platform machine of the above embodiments comprises crawlers 111 and 111 as traveling means. However, it is not necessary that the crawler body 110 have these crawlers, so the crawler body may comprise a plurality of tires instead. In the above embodiments, the boom 114 is used as means of lifting the platform 116. However, this lifting means may be a vertically lifting scissors linkage instead. In this case, it is preferable that the speed reduction of the crawler body be arranged in correspondence to the varying height of the scissors linkage.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Applications No. 11-074906 filed on Mar. 19, 1999, and No. 11-338962 filed on Nov. 30, 1999, which are incorporated here in by reference.

What is claimed is:

1. A safety system for a boom-equipped vehicle including:

an automotive vehicle, an extensible boom provided on a vehicle body of said vehicle, said boom capable of being lifted or lowered thereon, and a work station which is mounted at a tip of said boom, comprising:

boom condition detecting means which detects operating state of said boom;

slope angle detecting means which detects inclination or slope angle of said vehicle being affected by a road condition; and warning means which takes a warning action on travel motion of said vehicle, based on values detected by said boom condition detecting means and said slope angle detecting means.

2. The safety system as set forth in claim 1, wherein said warning means takes a warning action which restricts the travel motion of said vehicle.

3. The safety system as set forth in claim 1, wherein said warning means takes a warning action which gives an alarm sound or an alarm display on the travel motion of said vehicle.

4. The safety system as set forth in claim 1, wherein:

said boom condition detecting means comprises elevation angle detecting means which detects elevation angle of said boom and length detecting means which detects length of said boom; and said warning means takes a warning action if the elevation angle of said boom detected by said elevation angle detecting means is greater than a predetermined reference elevation angle or if the length of said boom detected by said length detecting means is greater than a predetermined reference length and if the slope angle of said vehicle body detected by said slope angle detecting means is greater than a predetermined reference slope angle.

5. The safety system as set forth in claim 1, wherein:

said boom condition detecting means comprises elevation angle detecting means which detects elevation angle of said boom and length detecting means which detects length of said boom; and said warning means takes a warning action if the slope angle of said vehicle body detected by said slope angle detecting means is greater than a reference slope angle which is determined in correspondence to combination of the elevation angle of said boom detected by said elevation angle detecting means and the length of said boom detected by said length detecting means.

6. The safety system as set forth in claim 4 or 5, further comprising boom actuation restricting means which forbids lifting and extending of said boom while said warning means is taking a warning action.

7. The safety system as set forth in claim 1, further comprising step detecting means which detects magnitude of a step present ahead of said vehicle body, wherein:

said slope angle detecting means determines the slope angle of said vehicle body traveling over the step, based on the magnitude of the step detected by said step detecting means.

8. The safety system as set forth in claim 1, further comprising:

speed detecting means which detects traveling speed of said vehicle body;

safety speed calculating means which calculates a safety speed for said vehicle to travel safely, based on the slope angle of said vehicle body detected by said slope angle detecting means; and comparing means which compares the traveling speed of said vehicle body detected by said speed detecting means with the safety speed calculated by said safety speed calculating means and outputs a warning signal to said warning means if said traveling speed is greater than said safety speed;

wherein:

said warning means takes a warning action when it receives said warning signal from said comparing means.

9. The safety system as set forth in claim 8, wherein said safety speed calculating means calculates said safety speed, based on the operating state of said boom detected by said boom condition detecting means.

10. The safety system as set forth in claim 9, wherein said warning means takes a warning action which reduces the traveling speed of said vehicle so that the traveling speed of said vehicle becomes smaller than said safety speed.

11. The safety system as set forth in claim 1, further comprising step detecting means which detects magnitude of a step present ahead of said vehicle body, wherein:

said slope angle detecting means determines the slope angle of said vehicle body traveling over the step, based on the magnitude of the step detected by said step detecting means; and if the slope angle of said vehicle body determined by said slope angle detecting means is greater than a predetermined value, then said warning means takes a warning action before said vehicle reaches said step.

12. The safety system as set forth in claim 1, further comprising step detecting means which detects magnitude of a step present ahead of said vehicle body, wherein:

if the magnitude of the step detected by said step detecting means is greater than a predetermined value, then said warning means takes a warning action.

* * * * *